Oct. 22, 1940.　　　　S. A. PLATT　　　　2,218,974
WARMING DEVICE
Filed April 20, 1939
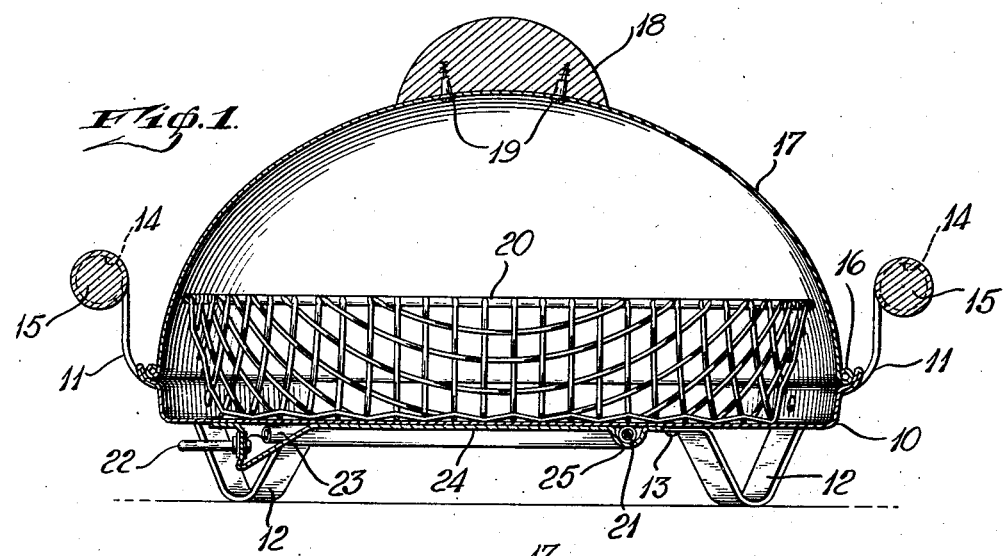
Fig. 1.
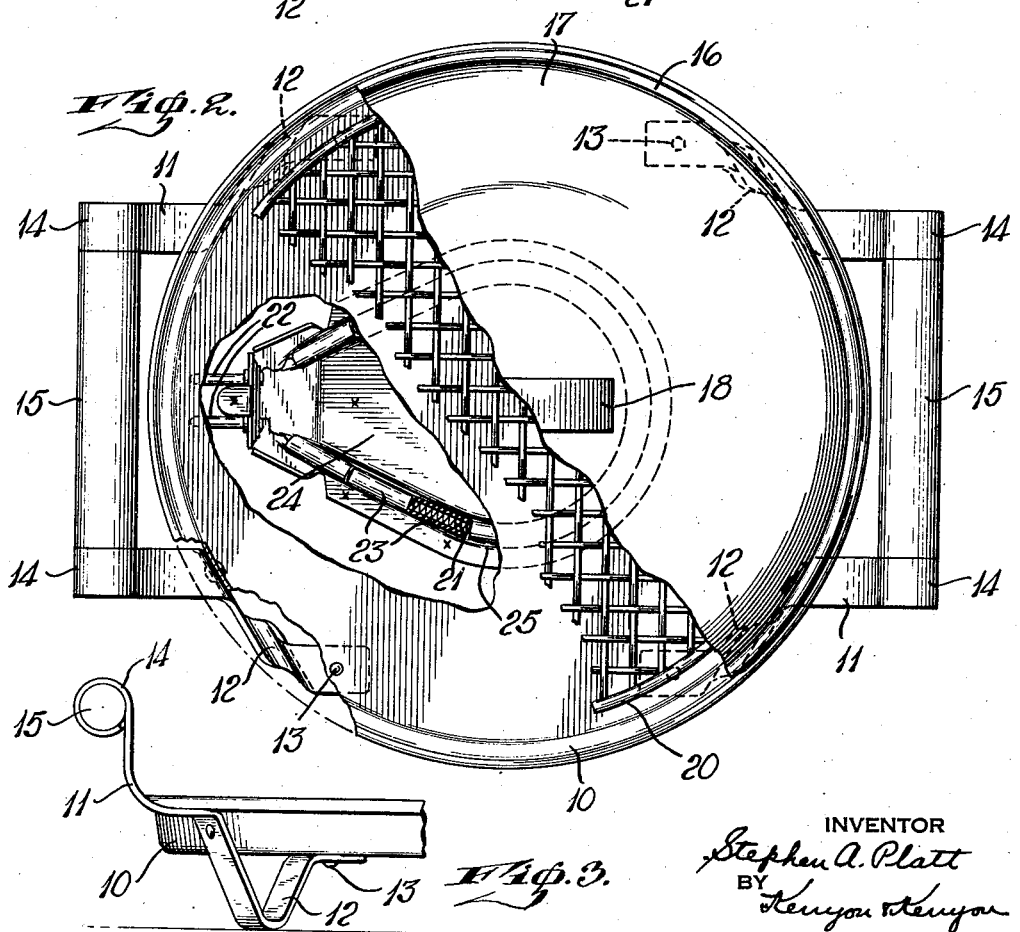
Fig. 2.
Fig. 3.
INVENTOR
Stephen A. Platt
BY
Kenyon & Kenyon
ATTORNEYS Patented Oct. 22, 1940

2,218,974

UNITED STATES PATENT OFFICE 2,218,974

WARMING DEVICE

Stephen A. Platt, Decatur, Ill., assignor to U. S. Manufacturing Corporation, Decatur, Ill., a corporation of Illinois Application April 20, 1939, Serial No. 268,889

8 Claims. (Cl. 53—6)

This invention relates to warming devices and more especially to devices for warming rolls and other similar foodstuffs.

An object of this invention is a light, inexpensive, efficient and quick heating device suitable for use in warming foodstuffs, such for example, as rolls.

Other objects, novel features and advantages of this invention will become apparent from the following specification and accompanying drawing, wherein:

Fig. 1 is a vertical section through a warming device embodying the invention;

Fig. 2 is a plan view partially broken away, and

Fig. 3 is a fragmentary side elevation of a portion of the device.

A flanged metal pan 10 is provided with two pairs of combination leg and handle members 11. Each member 11 comprises a metal strap riveted to the flange of the pan 10 approximately midway between the ends of the strap with a portion extending downwardly and a portion extending upwardly. The downwardly extending portion is provided with a reverse bend to provide a leg 12 of general V-shape, the extreme end of the strap being parallel to and connected to the bottom of the pan by suitable means, such for example, as a rivet 13. The upwardly extending part of each strap 11 is formed into a loop 14 and each pair of loops 14 is interconnected by a handle 15 of any suitbale material of low co-efficient of heat conductivity. The pan is supported by the legs 12 and the handles 15 provide means by which the pan may be lifted and moved about as desired.

The upper edge of the flange of the pan 10 is offset outwardly slightly to provide a shoulder upon which is adapted to rest the bead 16 at the rim of a substantially semi-spherical cover 17 and which, when in position, forms an enclosure with the pan 10. The cover 17 is equipped with a handle 18 of any suitable material having a low co-efficient of heat conductivity, the handle 18 being attached to the cover 17 by any suitable means, such, for example, as the screws 19. A basket 20 preferably constructed of wire mesh is provided for holding the rolls or other foodstuffs to be warmed and provides means for easily inserting or removing the same from the heater.

Electrical heating means are provided for supplying heat to the pan 10. Such means constitutes a resistance wire 21 connected to standard terminals 22. The resistance wire 21 is enclosed in a multiple section tubular insulator 23 which contacts the bottom of the pan 10. The heating element is held in place by a metal plate 24 having an offset portion or trough 25 in which is received the insulator 23. The plate 24 is permanently attached to the pan 10 either by welding as indicated in the drawing or by means of rivets or the like. Adjacent the ends of the trough and the ends of the tubular insulator, the plate 24 is shaped to form a vertical portion in which the terminals 22 are insulatingly supported in proper relation to co-operate with a standard electrical connector.

The device above described is easy to manufacture and of low cost by reason of the simplicity of its structure. Furthermore, due to the fact that the heating element is supported directly in contact with the bottom of the pan 10, the device is quick heating and efficient in operation. Furthermore, it is of attractive appearance and is ornamental as well as useful.

I claim:

1. A roll warmer comprising a metal pan having a flange, combination leg and handle members for said pan, each of said members comprising a metal strap attached midway between its ends to said flange and extending upwardly and downwardly therefrom, the downwardly extending portion being formed with a bend to bring the end thereof into contact with the bottom of said pan and the upwardly extending portion being formed into a loop to receive a handle.

2. A roll warmer comprising a metal pan having a flange, two pairs of combination leg and handle members, each of said members comprising a metal strap attached midway between its ends to said flange and extending upwardly and downwardly therefrom, the downwardly extending portion being formed with a bend to bring the end thereof into contact with the bottom of said pan and the upwardly extending portion being formed into a loop, and an interconnecting handle for each pair of members having its ends extending into said loops.

3. A roll warmer or the like comprising a metal pan, combination leg and handle members for said pan, each of said members comprising a metal strap attached midway between its ends to said pan and extending upwardly and downwardly therefrom, the downwardly extending portion being formed with a bend to bring the end thereof into contact with the bottom of said pan and the upwardly extending portion being formed into a loop to receive a handle, and means for attaching said contacting ends to the bottom of said pan.

4. A roll warmer or the like comprising a metal pan, two pairs of combination leg and handle members, each of said members comprising a metal strap attached midway between its ends to said pan and extending upwardly and downwardly therefrom, the downwardly extending portion being formed with a bend to bring the end thereof into contact with the bottom of said pan and the upwardly extending portion being formed into a loop, and an interconnecting handle for each pair of members having its ends extending into said loops, and means for attaching the end of each strap in contact with the bottom of said pan to said bottom.

5. A roll warmer or the like comprising a strap formed into V-shape between its center portion and one end, a pan having a flange, said strap having said end connected to the bottom of said pan and said center portion connected to said flange and having its other end portion formed into a loop to receive a handle member.

6. A roll warmer or the like comprising a flanged pan and two pairs of combination leg and handle members supporting said pan, each strap being formed into V-shape between its center and one end and having said end connected to the bottom of said pan and the center portion connected to said flange and its other end formed into a loop, and a handle member for each pair of straps having its ends received in said loops.

7. An electrically heated roll warmer or the like comprising a strap formed into V-shape between its center portion and one end, a pan having a flange, and said strap having said end extending parallel to, in contact with and connected to the bottom of said pan and said center portion connected to said flange and having its other end portion formed into a loop to receive a handle member.

8. An electrically heated roll warmer or the like comprising a flanged pan and two pairs of combination leg and handle members supporting said pan, each strap being formed into V-shape between its center and one end and having said end extending parallel to, in contact with and connected to the bottom of said pan and the center portion connected to said flange and its other end formed into a loop, and a handle member for each pair of straps having its ends received in said loops.

STEPHEN A. PLATT.

CERTIFICATE OF CORRECTION.

Patent No. 2,218,974. October 22, 1940.

STEPHEN A. PLATT.

It is hereby certified that error appears in the printed specification of the above numbered patent requiring correction as follows: Page 2, first column, line 4, claim 4, strike out the word "two"; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.